US010147914B2

(12) United States Patent
Ueda et al.

(10) Patent No.: US 10,147,914 B2
(45) Date of Patent: Dec. 4, 2018

(54) THIN BATTERY AND BATTERY-MOUNTED DEVICE

(71) Applicant: Panasonic Intellectual Property Management Co., Ltd., Osaka (JP)

(72) Inventors: Tomohiro Ueda, Osaka (JP); Yuya Asano, Osaka (JP); Yoko Sano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 176 days.

(21) Appl. No.: 15/104,862

(22) PCT Filed: Feb. 12, 2015

(86) PCT No.: PCT/JP2015/000625
§ 371 (c)(1),
(2) Date: Jun. 15, 2016

(87) PCT Pub. No.: WO2015/133066
PCT Pub. Date: Sep. 11, 2015

(65) Prior Publication Data
US 2017/0141359 A1    May 18, 2017

(30) Foreign Application Priority Data
Mar. 5, 2014    (JP) .................... 2014-043089

(51) Int. Cl.
*H01M 2/02*        (2006.01)
*H01M 10/04*       (2006.01)
(Continued)

(52) U.S. Cl.
CPC ........... *H01M 2/0275* (2013.01); *H01M 4/13* (2013.01); *H01M 4/623* (2013.01); *H01M 6/16* (2013.01);
(Continued)

(58) Field of Classification Search
CPC ........ H01M 2/02; H01M 2/2075; H01M 6/16; H01M 10/04; H01M 10/0436; H01M 10/0525; H01M 10/0565
See application file for complete search history.

(56) References Cited

U.S. PATENT DOCUMENTS

2006/0188777 A1    8/2006   Kaneta
2009/0317721 A1    12/2009  Shirane et al.
(Continued)

FOREIGN PATENT DOCUMENTS

JP    1-302660      12/1989
JP    2005-183073   7/2005
(Continued)

OTHER PUBLICATIONS

International Search Report of PCT application No. PCT/JP2015/000625 dated Apr. 28, 2015.
(Continued)

Primary Examiner — Karie O'Neill Apicella
(74) Attorney, Agent, or Firm — McDermott Will & Emery LLP

(57) ABSTRACT

A thin battery includes a sheet-like electrode assembly; a non-aqueous electrolyte with which the electrode assembly is impregnated; and a housing in a sealed manner. The electrode assembly includes a pair of first electrodes located at an outermost side of the electrode assembly, a second electrode interposed between the pair of first electrodes, and a separator disposed between each first electrode and the second electrode. The first electrode includes a first current collector sheet and a first active material layer attached to one surface of the first current collector sheet. The second electrode includes a second current collector sheet and second active material layers attached to both surfaces of the second current collector sheet. A content x of the non-aqueous electrolyte per unit area of the first active material layer is larger than a content y of the non-aqueous electrolyte per unit area of the second active material layer.

14 Claims, 4 Drawing Sheets

(51) Int. Cl.
  *H01M 10/0525* (2010.01)
  *H01M 10/0565* (2010.01)
  *H01M 6/16* (2006.01)
  *H01M 10/0566* (2010.01)
  *H01M 10/0585* (2010.01)
  *H01M 4/13* (2010.01)
  *H01M 4/62* (2006.01)

(52) U.S. Cl.
  CPC ... *H01M 10/0436* (2013.01); *H01M 10/0525* (2013.01); *H01M 10/0565* (2013.01); *H01M 10/0566* (2013.01); *H01M 10/0585* (2013.01); *H01M 2220/30* (2013.01)

(56) References Cited

U.S. PATENT DOCUMENTS

2013/0252065 A1* 9/2013 Ueda ................. H01M 10/0585 429/127
2014/0373344 A1* 12/2014 Takada ................. H01G 9/0029 29/623.5

FOREIGN PATENT DOCUMENTS

| JP | 2006-210089 | 8/2006 |
| JP | 2007-042525 A | 2/2007 |
| JP | 2007-109636 | 4/2007 |
| JP | 2007-214038 | 8/2007 |
| JP | 2011-113667 | 6/2011 |
| JP | 2011-204490 | 10/2011 |
| JP | 2013-016515 | 1/2013 |
| JP | 2013-048041 | 3/2013 |
| JP | 2013-138096 | 7/2013 |
| JP | 2013-191391 | 9/2013 |
| WO | 2005/013408 | 2/2005 |
| WO | 2008/029719 | 3/2008 |
| WO | 2013/118804 A1 | 8/2013 |

OTHER PUBLICATIONS

English Translation of Chinese Search Report dated Apr. 24, 2018 for the related Chinese Patent Application No. 201580004558.X.

* cited by examiner

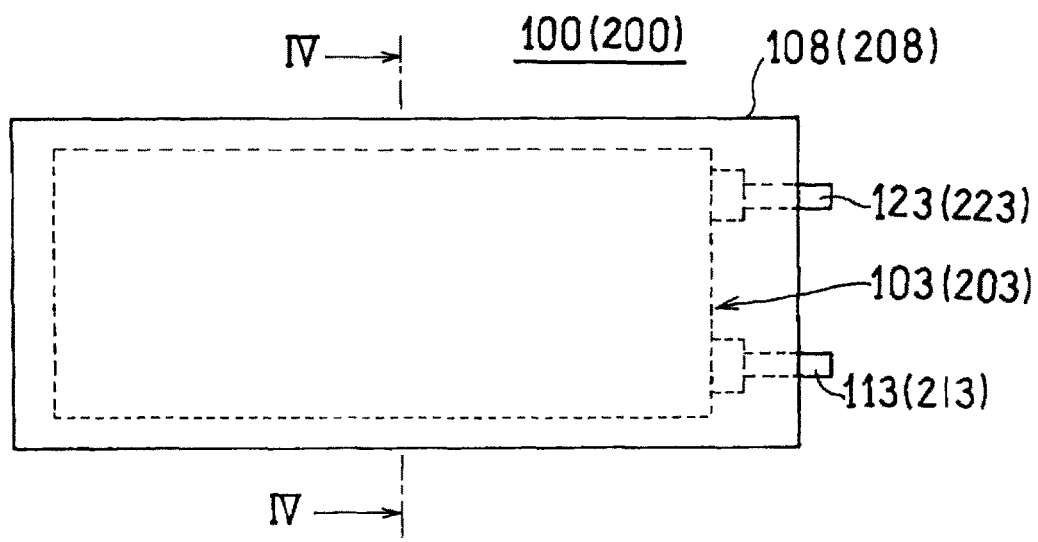
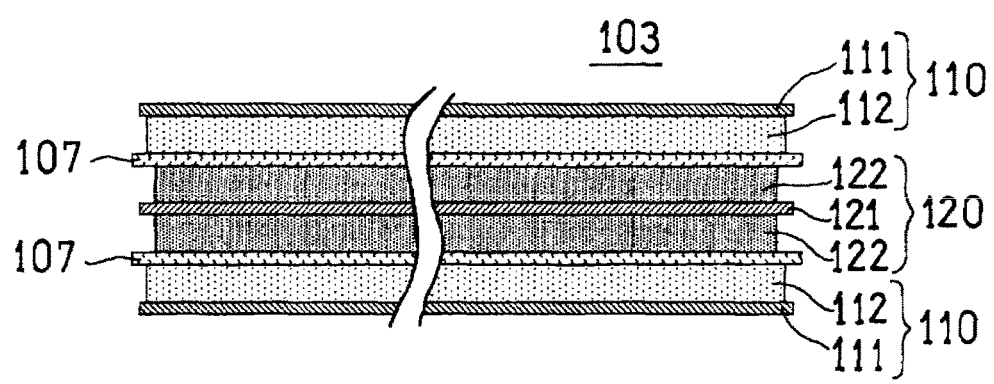

THIN BATTERY AND BATTERY-MOUNTED DEVICE

TECHNICAL FIELD

The present invention relates to a thin battery including a sheet-like electrode assembly, a non-aqueous electrolyte with which the electrode assembly is impregnated, and a housing for housing the electrode assembly and the non-aqueous electrolyte in a sealed manner, and relates to a battery-mounted device in which the thin battery is mounted.

BACKGROUND ART

In recent years, thin batteries have been used as power sources for small-sized electronic equipment such as biological wearable devices, portable telephones, recording and playing-back devices, wristwatches, video and still cameras, liquid crystal displays, electronic calculators, IC cards, temperature sensors, hearing aids, and pressure-sensitive buzzers. Such thin batteries are required to have flexibility. For example, a thin battery to be mounted to a biological wearable device or a wearable portable terminal is required to be deformed in response to the movement of a living body. Thus, a thin battery having a housing made of a thin and flexible laminate film has been proposed (see PTL 1).

CITATION LIST

Patent Literature

PTL 1: Japanese Patent Application Unexamined Publication No. 2013-48041

SUMMARY OF THE INVENTION

In general, when a battery is deformed by an external force, battery performance is deteriorated. On the other hand, since it is premised that a thin battery is highly flexible, the thin battery needs to maintain battery performance even when it is deformed.

In view of the foregoing, a first aspect of the present invention relates to a thin battery including: a sheet-like electrode assembly; a non-aqueous electrolyte with which the electrode assembly is impregnated; and a housing for housing the electrode assembly and the non-aqueous electrolyte in a sealed manner. The electrode assembly includes a pair of first electrodes disposed at an outermost side of the electrode assembly, a second electrode disposed between the pair of first electrodes, and a separator disposed between each first electrode and the second electrode. Each first electrode includes a first current collector sheet and a first active material layer attached to one surface of the first current collector sheet. The second electrode has a polarity different from a polarity of the first electrode, and includes a second current collector sheet and second active material layers attached to both surfaces of the second current collector sheet. A content x of the non-aqueous electrolyte per unit area of the first active material layer is larger than a content y of the non-aqueous electrolyte per unit area of the second active material layer.

A second aspect of the present invention relates to a battery-mounted device including: the thin battery as mentioned above; flexible electronic equipment to be driven by electric power supplied from the thin battery. The thin battery and the electronic equipment are integrated together to form a sheet.

According to the present invention, even when a thin battery and a battery-mounted device are bent repeatedly by an external force, decrease of battery performance can be suppressed.

BRIEF DESCRIPTION OF THE DRAWINGS

FIG. 3 is a plan view of a thin battery in accordance with a first exemplary embodiment of the present invention.

FIG. 4 is a longitudinal sectional view conceptually showing a structure of an electrode assembly of the thin battery in accordance with the first exemplary embodiment of the present invention.

DETAILED DESCRIPTION OF THE PREFERRED EMBODIMENT

Figure 1:
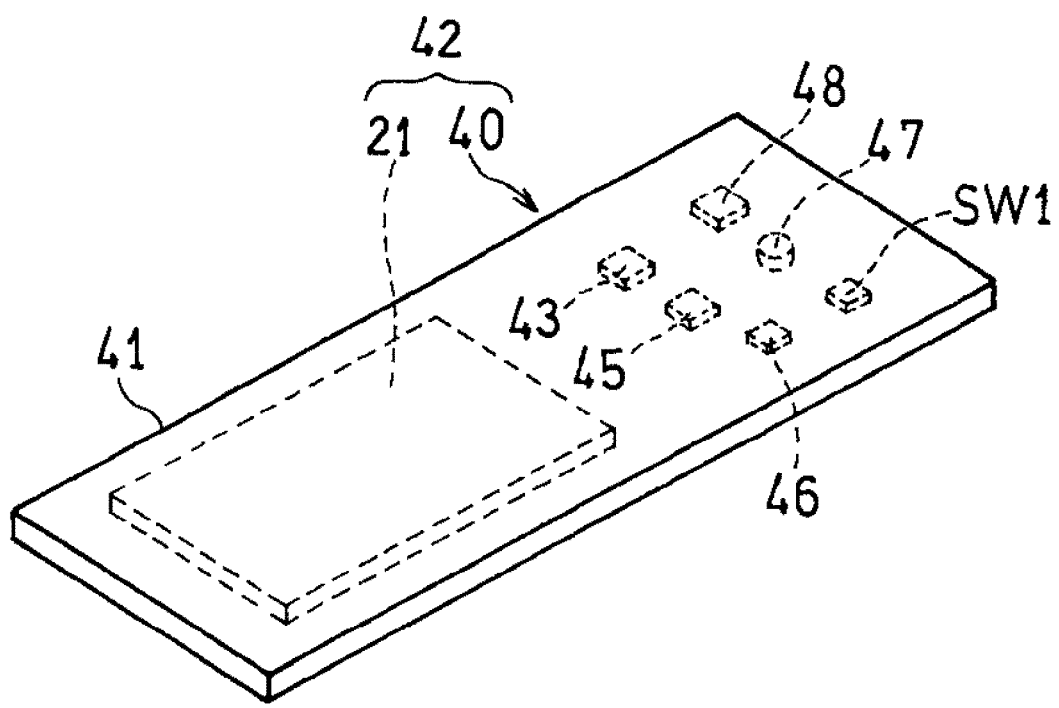
FIG. 1 is a perspective view showing an example of a battery-mounted device (biological wearable device) including a thin battery.

A first aspect of the present invention relates to a thin battery including a sheet-like electrode assembly, a non-aqueous electrolyte with which the electrode assembly is impregnated, and a housing for housing the electrode assembly and the non-aqueous electrolyte in a sealed manner. The electrode assembly includes a pair of first electrodes disposed at an outermost side of the electrode assembly, a second electrode disposed between the pair of first electrodes, and a separator disposed between each first electrode and the second electrode. Each first electrode includes a first current collector sheet and a first active material layer attached to one surface of the first current collector sheet. The second electrode has a polarity different from that of the first electrode, and includes a second current collector sheet and second active material layers attached to both surfaces of the second current collector sheet.

Herein, a content x of the non-aqueous electrolyte per unit area of the first active material layer is larger than a content y of the non-aqueous electrolyte per unit area of the second active material layer. Note here that the contents x and y are values (W/S or V/S) obtained by dividing the mass (W) or the volume (V) of an amount of the non-aqueous electrolyte contained in the active material layer by a projected area (S) of each of the active material layers seen in the normal direction (a direction perpendicular to the planar direction of the current collector sheet).

When the thin battery is bent, in general, mobility of the non-aqueous electrolyte in the first active material layer disposed at the outermost side of the electrode assembly is large. Repeated bending of the thin battery gradually reduces the non-aqueous electrolyte with which the first active material layer is impregnated. Then, shortage of the non-aqueous electrolyte inhibits the processing of the battery reaction. On the other hand, when the content x of the non-aqueous electrolyte contained in the first active material layer is made larger than the content y of the non-aqueous electrolyte contained in the second active material layer, even when the thin battery is bent repeatedly, it is possible to sufficiently secure the amount of non-aqueous electrolyte with which the first active material layer is impregnated. Consequently, even after the thin battery is bent repeatedly, capacity approximate to the initial battery capacity can be maintained.

It is preferable that the content x of the non-aqueous electrolyte per unit area of the first active material layer and the content y of the non-aqueous electrolyte per unit area of the second active material layer satisfy: $1.1 \leq x/y \leq 8$. This further facilitates securing of the amount of non-aqueous electrolyte with which the first active material layer is impregnated after repeated bending.

A thin battery having the simplest structure includes a pair of first electrodes disposed at the outermost side of the electrode assembly, one second electrode disposed between the pair of first electrodes, and a separator interposed between each first electrode and the second electrode. That is to say, the electrode assembly includes two first electrodes, one second electrode, and a separator (first electrode-second electrode-first electrode).

A thin battery having another structure includes two or more second electrodes, and further includes one or more third electrodes disposed between the pair of second electrodes. Herein, the third electrode has the same polarity as that of the first electrode, and includes a third current collector sheet and third active material layers attached to both surfaces of the third current collector sheet. In this case, the second electrode and the third electrode are alternately disposed. For example, the third electrode (having the same polarity as that of the first electrode) is disposed in the center of the electrode assembly. The third electrode is disposed between the pair of second electrodes. The pair of the first electrodes sandwich a laminated body of the second electrode and the third electrode (first electrode-second electrode-third electrode-second electrode-first electrode).

The content x of the non-aqueous electrolyte per unit area of the first active material layer and a content z of the non-aqueous electrolyte per unit area of the third active material layer satisfy $z \leq x$. That is to say, the content x is always the maximum but the content x may be the same as the content z. This prevents the non-aqueous electrolyte around the center of the electrode assembly from being exhausted, even when the number of laminates of the electrodes contained in the electrode assembly is increased. Furthermore, this facilitates controlling of the distribution of the non-aqueous electrolyte in the whole electrode assembly.

It is preferable that the content z of the non-aqueous electrolyte per unit area of the third active material layer is larger than the content y of the non-aqueous electrolyte per unit area of the second active material layer, that is, $y<z$ is satisfied. Thus, on both sides of the second active material layer having a small content of the non-aqueous electrolyte, the first material layers or third active material layers, having a large content of the non-aqueous electrolyte, are disposed. This further facilitates controlling of the distribution of the non-aqueous electrolyte in the whole electrode assembly.

In more generalization, a thin battery of still another structure includes n second electrodes, and may include (n−1) third electrodes, wherein n is an integer of 2 or more. For example, when n is 3, the second electrode is disposed in the center of the electrode assembly. The second electrode located in the center is disposed between the pair of third electrodes. A laminated body composed of the second electrode in the center and the pair of third electrodes sandwiching the second electrode is sandwiched between the pair of second electrodes; the resultant laminated body is further sandwiched between the pair of first electrodes (first electrode-second electrode-third electrode-second electrode-third electrode-second electrode-first electrode).

It is preferable that a porosity A of the first active material layer is 20 to 80% inclusively. This allows easy impregnation of the first active material layer with a larger amount of the non-aqueous electrolyte. At this time, it is preferable that a porosity B of the second active material layer is smaller than the porosity A. This facilitates controlling of the distribution of the non-aqueous electrolyte in the electrode assembly such that $y<x$ is satisfied. Furthermore, since the first electrode has the first active material layer only on one surface of the first current collector sheet, warping is likely to occur. Even when the degree of warping of the first electrode is small, the warping becomes apparent in a thin battery having a small thickness. This may make it difficult to install the thin battery on electronic equipment, or may give uncomfortable feeling to a user. On the other hand, when the porosity A of the first active material layer is controlled to fall within the above-mentioned range, it is possible to obtain an accompanying effect that warping of the first electrode can be reduced.

When the first electrode is a negative electrode, the first active material layer includes a negative electrode active material, and a binder. At this time, the binder is preferably a fluorocarbon resin including a polyvinylidene fluoride unit. The fluorocarbon resin including a polyvinylidene fluoride unit easily holds a non-aqueous electrolyte. Consequently, the non-aqueous electrolyte is easily held by the first active material layer. Thus, $y<x$ is satisfied more easily.

It is preferable that at least a part of the non-aqueous electrolyte contained in the first active material layer is in a gel state. This suppresses the outflow of the non-aqueous electrolyte from the first active material layer, and allows easy retention of capacity after repeated bending. Furthermore, even when the first electrode disposed at the outermost side of the electrode assembly is impregnated with a large amount of the non-aqueous electrolyte, liquid leakage may not easily occur.

In one exemplary embodiment, an area of the first active material layer is larger than that of the second active material layer. This allows easier distribution of the non-aqueous electrolyte in the first electrode located at the outermost side of the electrode assembly.

A second aspect of the present invention relates to a battery-mounted device including a thin battery, and flexible electronic equipment to be driven by electric power supplied from the thin battery. In the battery-mounted device, the thin battery and the electronic equipment are integrated together to form a sheet. Since such a battery-mounted device is not deteriorated even after it is bent repeatedly, the lifetime of the device can be extended.

Examples of the electronic equipment to be integrated together with the thin battery to form a sheet include a biological wearable device or a wearable portable terminal, a portable telephone, a recording and playing-back device, a wristwatch, a video and still camera, a liquid crystal display, an electronic calculator, an IC card, a temperature sensor, a hearing aid, a pressure-sensitive buzzer, and the like. In particular, since the biological wearable device is used in such a manner as to be in close contact with a living body, flexibility is required. Examples of the biological wearable device include a biological information measuring device, an iontophoretic dermal administration device, and the like.

The thickness of the thin battery is not particularly limited, and is preferably 3 mm or less, and further preferably 2 mm or less, in view of the flexibility. The thickness of the sheet-like battery-mounted device may be larger than the thickness of the thin battery. However, from the same view as mentioned above, the thickness is preferably 3 mm or less. However, when the thin battery and the battery-mounted device have a thickness of about 5 mm or less, relatively excellent flexibility can be obtained. It is technically difficult to extremely reduce the thickness, the lower limit of the thickness is, for example, 50 μm.

Hereinafter, exemplary embodiments of the present invention are described in more detail. However, the following exemplary embodiments are not constructed to limit the scope of the present invention.

Figure 2:
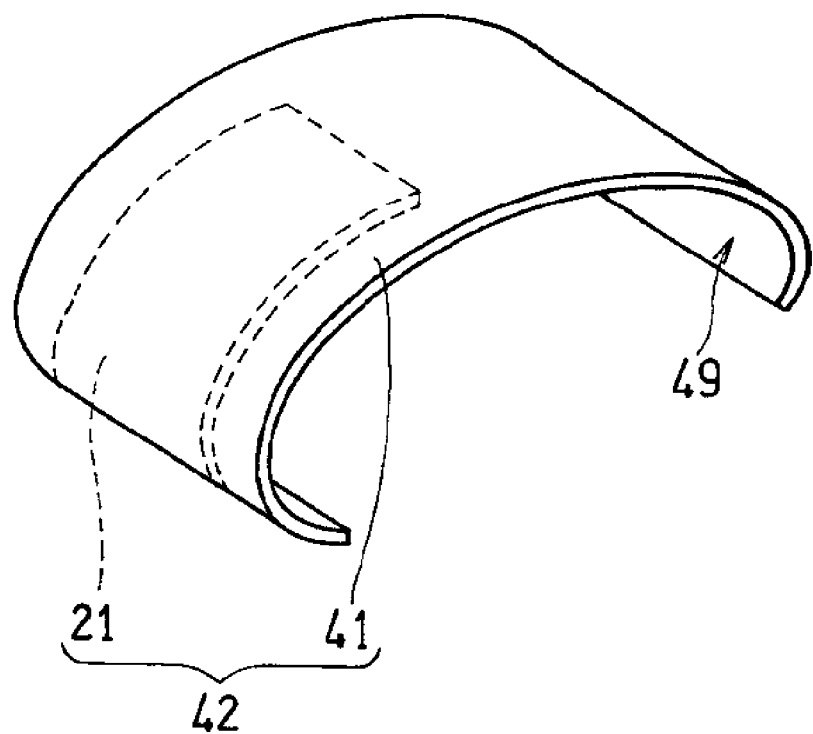
FIG. 2 is a perspective view showing an example of an appearance of the device when deformed.

FIG. 1 is a perspective view showing an example of battery-mounted device 42 provided with a biological information measuring device as electronic equipment. FIG. 2 shows an example of an appearance of the device when the device is deformed.

Biological information measuring device 40 includes sheet-like holding member 41 for holding component elements thereof and a thin battery. Holding member 41 is made of a flexible material. Elements such as temperature sensor 43, pressure-sensitive element 45, memory 46, information transmitter 47, button switch SW1, and controller 48 are embedded in holding member 41. Thin battery 21 occupies a flat space provided inside holding member 41. That is to say, thin battery 21 and biological information measuring device 40 are integrated together to form a sheet so as to produce battery-mounted device 42. For holding member 41, for example, an electrically insulated resin material can be used. Applying, for example, adhesive 49 having adhesive strength to one main surface of battery-electronic device assembly 42 enables battery-mounted device 42 to be placed around the wrist, ankle, neck, and other parts of the user.

Temperature sensor 43 includes, for example, a heat-sensitive element such as a thermistor or a thermocouple; and outputs signals indicating a body temperature of a user, to controller 48. Pressure-sensitive element 45 outputs signals indicating blood pressure and pulse of a user, to controller 48. For memory 46 which stores information corresponding to the signals that have been output, for example, a nonvolatile memory can be used. Information transmitter 47 converts necessary information into radio waves in response to the signals from controller 48, and then radiates the radio waves. Switch SW1 is used for turning on or off biological information measuring device 40. Temperature sensor 43, pressure-sensitive element 45, memory 46, information transmitter 47, switch SW1, and controller 48 are attached to, for example, a flexible substrate, and electrically connected to each other by a wiring pattern formed on the surface of the substrate.

Controller 48 includes a CPU (Central Processing Unit) for executing a predetermined operation processing, ROM (Read Only Memory) storing a control program of the device, RAM (Random Access Memory) for temporarily storing data, and peripheral circuits thereof. The control program stored in the ROM is executed so as to control operation of each parts of biological information measuring device 40.

Next, a thin battery in accordance with the first exemplary embodiment of the present invention is described with reference to FIGS. 3 and 4.

FIG. 3 is a plan view of an example of the thin battery. FIG. 4 is a longitudinal sectional view conceptually showing an example of an electrode assembly having the simplest structure. Note here that FIG. 4 is a sectional view taken on line IV-IV of the thin battery shown in FIG. 3.

Thin battery 100 includes electrode assembly 103, non-aqueous electrolyte (not shown), and housing 108 for housing electrode assembly 103 and the non-aqueous electrolyte. Electrode assembly 103 includes a pair of first electrodes 110 located at the outer side, second electrode 120 disposed between the pair of first electrodes 110, and separator 107 interposed between each first electrode 110 and second electrode 120. First electrode 110 includes first current collector sheet 111 and first active material layer 112 attached to one surface of first current collector sheet 111. Second electrode 120 includes second current collector sheet 121 and second active material layers 122 attached to both surfaces of second current collector sheet 121. The pair of first electrodes 110 are disposed with second electrode 120 sandwiched therebetween such that first active material layer 112 and second active material layer 122 face each other with separator 107 interposed therebetween. First lead 113 is connected to first current collector sheet 111, and second lead 123 is connected to second current collector sheet 121. One end portion of first lead 113 and one end portion of second lead 123 are extended from housing 108 to the outside, respectively. The extended end portions serve as a positive electrode external terminal or a negative electrode external terminal. Note here that, a sealing material may be interposed between housing 108 and each lead in order to enhance sealing property. For the sealing material, thermoplastic resin can be used.

In the case of electrode assembly 100, the content x of the non-aqueous electrolyte per unit area of first active material layer 112 disposed at the outer side is larger than the content y of the non-aqueous electrolyte per unit area of second active material layer 122 disposed at an inner side. This allows easier distribution of a sufficient amount of the non-aqueous electrolyte in first active material layer 112 even after thin battery 100 is bent repeatedly. Thus, the battery capacity is easily maintained.

The content x of the non-aqueous electrolyte per unit area of first active material layer 112 and the content y of the non-aqueous electrolyte per unit area of second active material layer 122 may satisfy the relation: $y<x$, preferably $1.1 \leq x/y \leq 8$, more preferably $2 \leq x/y \leq 8$, and further preferably $3 \leq x/y \leq 8$. This allows easier securing of the amount of the non-aqueous electrolyte with which the first active material layer is impregnated even after bending is repeated.

When x/y is made to be 1.1 or more, the non-aqueous electrolyte is distributed in electrode assembly 103 in a state in which electrode assembly 103 is unevenly present in first electrode 110 unlike general batteries. As a result, even if thin battery 100 is deformed repeatedly, first active material layer 112 secures a sufficient amount of the non-aqueous electrolyte. On the other hand, when x/y is made to be 8 or less, leakage of the non-aqueous electrolyte from housing 108 is easily prevented.

Next, thin battery 200 in accordance with a second exemplary embodiment of the present invention is described with reference to FIG. 5.

Figure 5:
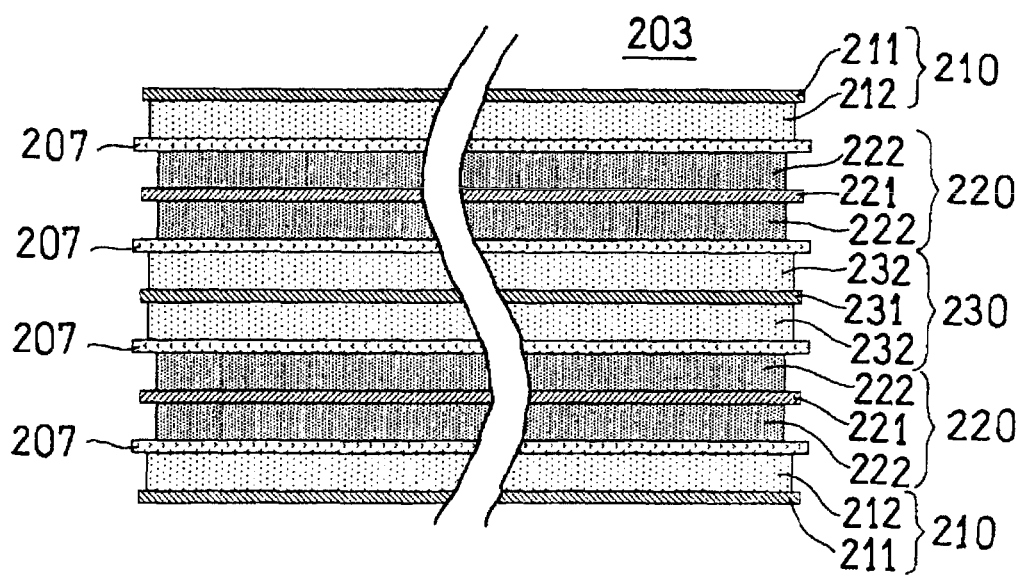
FIG. 5 is a longitudinal sectional view conceptually showing a structure of an electrode assembly of a thin battery in accordance with a second exemplary embodiment of the present invention.

FIG. 5 is a longitudinal sectional view conceptually showing an example of an electrode assembly having the second simplest structure provided in a thin battery.

Electrode assembly 203 includes a pair of first electrodes 210 disposed at the outermost side, a pair of second electrodes 220 disposed therebetween, third electrode 230 disposed between the pair of second electrode 220 (that is, in the center), separator 207 interposed between electrodes having different polarity. First electrode 210 and third electrode 230 have the same polarity.

Configurations of first electrode 210 and second electrode 220 are the same as those in the first exemplary embodiment. That is to say, first electrode 210 includes first current collector sheet 211 and first active material layer 212 attached to one surface of first current collector sheet 211. Second electrode 220 includes second current collector sheet 221 and second active material layers 222 attached to both surfaces of second current collector sheet 221. Third electrode 230 has the same configuration as that of first electrode 210 except that it has active material layers on both surfaces thereof. Third electrode 230 includes third current collector sheet 231 and third active material layers 232 attached to both surfaces of third current collector sheet 231.

First lead 213 is connected to first current collector sheet 211; second lead 223 is connected to second current collector sheet 221, and third lead (not shown) is connected to third current collector sheet 231. Since the third lead has the same polarity as that of first lead 213, it is connected to first lead 213 inside housing 208. One end portion of first lead 213 and one end portion of second lead 223 extended from housing 208 to the outside, respectively. The extended end portions serve as a positive electrode external terminal or a negative electrode external terminal.

Also in the case of electrode assembly 203, the relation between the content x of the non-aqueous electrolyte per unit area of first active material layer 212 disposed at the outermost side and the content y of the non-aqueous electrolyte per unit area of second active material layer 222 is the same as in the first exemplary embodiment.

On the other hand, the content x of the non-aqueous electrolyte per unit area of first active material layer 212 and the content z of the non-aqueous electrolyte per unit area of third active material layer 232 may satisfy z≤x, and preferably, for example, 1≤x/z≤8. This prevents the non-aqueous electrolyte around the center of the electrode assembly from being exhausted, and facilitates controlling of the distribution of the non-aqueous electrolyte in the whole electrode assembly.

Furthermore, the content z of the non-aqueous electrolyte per unit area of the third active material layer and the content y of the non-aqueous electrolyte per unit area of the second active material layer preferably satisfy y<z, and preferably 1.1≤z/y≤6. This further facilitates controlling of the distribution of the non-aqueous electrolyte in the whole electrode assembly.

Note here that when the number n of the second electrode is too large, the thickness of the thin battery becomes large, thus reducing the merit of the thin battery. Therefore, preferably n≤15 is satisfied, and more preferably n≤10 is satisfied. When the thickness of the thin battery is, for example, 1 mm or less, regardless of the number n of the second electrodes, the above-mentioned relation of x, y, and z can be satisfied. However, when n≤10 is satisfied, the effect by the above-mentioned relation of x, y and z is increased.

In any of the exemplary embodiments, the porosity A of the first active material layer is preferably 20 to 80% inclusive, and further preferably 25 to 60% inclusive. However, when the first active material layer is a positive electrode, the porosity A is preferably 20 to 30% inclusive, and more preferably 23 to 27% inclusive. Furthermore, when the first active material layer is a negative electrode, the porosity A is preferably 25 to 60% inclusive, and more preferably 40 to 60% inclusive. At this time, the porosity B of the second active material layer is smaller than the porosity A. It is preferable that the ratio A/B of the porosity A to the porosity B is, for example, 1.03 to 4.5 inclusive. Furthermore, the porosity C of the third active material layer is not more than the porosity A, and the ratio A/C of the porosity A to the porosity C may be, for example, 1 to 4 inclusive.

It is preferable that at least a part of the non-aqueous electrolyte contained in the first active material layer is in a gel state. For example, when the first active material layer is allowed to contain a matrix polymer retaining a non-aqueous electrolyte and swelling itself, the non-aqueous electrolyte contained in the first active material layer can be gelled. The non-aqueous electrolyte includes, for example, a mixture of a lithium salt and a non-aqueous solvent. Examples of the matrix polymer include a fluorocarbon resin including a polyvinylidene fluoride unit, acrylic resin including (meth)acrylic acid and/or (meth)acrylic ester unit, and polyether resin including a polyalkylene oxide unit, and the like.

Examples of the fluorocarbon resin including a polyvinylidene fluoride unit include polyvinylidene fluoride (PVdF), a copolymer containing a polyvinylidene fluoride (VdF) unit and a hexafluoropropylene (HFP) unit (PVdF-HFP), and a copolymer containing a polyvinylidene fluoride (VdF) unit and a trifluoroethylene (TFE) unit, and the like. It is preferable that the amount of polyvinylidene fluoride unit contained in the fluorocarbon resin including a polyvinylidene fluoride unit is 1 mol % or more such that the fluorocarbon resin is easily swollen with the non-aqueous electrolyte.

It is preferable that the ratio S1/S2 of the area S1 of the first active material layer to the area S2 of the second active material layer is 0.7 to 1.3 inclusive in view of more preferably controlling the distribution of the non-aqueous electrolyte included in the electrode assembly. Furthermore, when the first electrode is a negative electrode, and the second electrode is a positive electrode, the ratio S1/S2 is preferably more than 1 and further preferably 1.01 to 1.3 inclusive in view of not only preferably controlling the distribution of the non-aqueous electrolyte but also preventing the precipitation of metallic lithium.

On the other hand, it is preferable that the area S3 of the third active material layer having the same polarity as that of the first active material layer is about the same as the area S1 of the first active material layer in view of securing the capacity balance. For example, it is preferable that the ratio S1/S3 of the area S1 to the area S3 is 0.95 S1/S3 1.05.

Note here that the areas S1, S2, and S3 of the active material layers have the same meaning as the projected areas (S) of each active material layer seen from the normal direction (the direction perpendicular to the planer direction of the current collector sheet).

The housing is formed of, for example, a laminate film including a barrier layer, and resin layers respectively formed on both surfaces of the barrier layer. Inorganic materials to be used for the barrier layer are not particularly limited. For the inorganic materials, a metal layer, a ceramics layer, or the like, is suitably used in view of the barrier performance, strength, bending resistance, or the like. Preferable examples of the inorganic material include: metal materials such as aluminum, titanium, nickel, iron, platinum, gold, and silver; and ceramics materials such as silicon oxide, magnesium oxide, and aluminum oxide. It is preferable that the thickness of the barrier layer is, for example, 0.01 to 0.5 µm. In view of easiness of thermal welding, electrolyte resistance, and chemical resistance, material for the resin layer disposed at the inner side of the housing is preferably a polyolefin such as polyethylene (PE) or polypropylene (PP); polyethylene terephthalate, polyamide, polyurethane, polyethylene-vinyl acetate (EVA) copolymer, or the like. It is preferable that the thickness of the resin layer at the inner surface side is 10 to 100 µm inclusive. In view of strength, shock resistance, and chemical resistance, the resin layer disposed at the outer surface side of the housing is preferably a polyamide (PA) such as 6,6-nylon; a polyolefin; and a polyester such as polyethylene terephthalate (PET), polybutylene terephthalate, or the like. It is preferable that the thickness of the resin layer at the outer surface side is 5 to 100 µm inclusive.

When the first electrode is a positive electrode, the second electrode is a negative electrode. At this time, the third electrode is a positive electrode. When the first electrode is a negative electrode, the second electrode is a positive electrode. At this time, the third electrode is a negative electrode. Hereinafter, the configurations of the positive electrode and the negative electrode are described in more detail.

Negative Electrode

A negative electrode includes a negative electrode current collector sheet as a first or second current collector sheet, and a negative electrode active material layer as a first or second active material layer. When the first electrode is a negative electrode, the negative electrode active material layer is provided on one surface of the negative electrode current collector sheet. When the second electrode or the third electrode is a negative electrode, the negative electrode active material layers are provided on both surfaces of the negative electrode current collector sheet.

For the negative electrode current collector sheet, a metal film, a metal foil, or the like, is used. It is preferable that the negative electrode current collector sheet does not form an alloy with the negative electrode active material and has excellent electron conductivity. Thus, a material of the negative electrode current collector is preferably at least one selected from the group consisting of: copper, nickel, titanium, and an alloy thereof; and stainless steel. It is preferable that the thickness of the negative electrode current collector sheet is, for example, 5 to 30 µm inclusive.

The negative electrode active material layer includes a negative electrode active material and a binder, and includes a conductive agent if necessary. The negative electrode active material layer may be a porous deposited film formed by gas-phase deposition such as vapor deposition. Examples of the negative electrode active material include a carbon material (e.g., graphite), a silicon alloy, and a silicon oxide. The thickness of the negative electrode active material layer is preferably 1 to 300 µm inclusive. When the thickness of the negative electrode active material layer is 1 µm or more, sufficient capacity can be kept. On the other hand, when the thickness of negative electrode active material layer is 300 µm or less, the negative electrode can keep high flexibility, and stress to the thin battery less likely to occur during bending.

Note here that when the first electrode disposed at the outermost side of the electrode assembly is a negative electrode, a binder in the negative electrode active material layer preferably includes a fluorocarbon resin including a polyvinylidene fluoride unit. Among thin batteries using a non-aqueous electrolyte, a negative electrode of a lithium ion secondary battery mainly includes a carbon material as the active material. When the carbon material is used as the active material, in view of capable of achieving bind strength with a small amount, rubber particles (for example, styrene-butadiene rubber) is used as a binder. On the other hand, when rubber particle is used, the content of the non-aqueous electrolyte in the negative electrode is reduced at the time of discharging, and the relation: y<x may be less likely kept. On the other hand, use of a fluorocarbon resin including a polyvinylidene fluoride unit as the binder allows the first active material layer (negative electrode active material layer) to easily hold a non-aqueous electrolyte. This makes it easy to satisfy the relation: y<x. Furthermore, this allows easier gelation of the non-aqueous electrolyte included in the first active material layer.

Positive Electrode

A positive electrode includes a positive electrode current collector sheet as a first or second current collector sheet, and a positive electrode active material layer as the first or second active material layer. When the first electrode is a positive electrode, a positive electrode active material layer is provided on one surface of the positive electrode current collector sheet. When the second electrode or the third electrode is a positive electrode, the positive electrode active material layers are provided on both surfaces of the positive electrode current collector sheet.

For the positive electrode current collector sheet, a metal film, a metal foil, or the like, is used. Thus, a material of the positive electrode current collector sheet is preferably at least one selected from the group consisting of silver, nickel, palladium, gold, platinum, aluminum, and an alloy thereof; and stainless steel. The thickness of the positive electrode current collector sheet is preferably, for example, 1 to 30 µm inclusive.

The positive electrode active material layer includes a positive electrode active material and a binder, and, if necessary, a conductive agent. The positive electrode active material is not particularly limited. When the thin battery is a secondary battery, suitable materials include a lithium-containing composite oxide such as $Li_{xa}CoO_2$, $Li_{xa}NiO_2$, $Li_{xa}MnO_2$, $Li_{xa}Co_yNi_{1-y}O_2$, $Li_{xa}CO_yM_{1-y}O_z$, $Li_{xa}Ni_{1-y}M_yO_z$, $Li_{xb}Mn_2O_4$, $Li_{xb}Mn_{2-y}M_yO_4$, or the like. Herein, M is at least one element selected from the group consisting of Na, Mg, Sc, Y, Mn, Fe, Co, Ni, Cu, Zn, Al, Cr, Pb, Sb, and B; xa=0 to 1.2; xb=0 to 2; y=0 to 0.9; and z=2 to 2.3, are satisfied. Also, xa and xb are values before starting charge and discharge and the values are to increase and decrease by charge and discharge. When the thin battery is a primary battery, at least one selected from the group consisting of manganese dioxide, fluorinated carbon (fluorinated graphite), a lithium-containing composite oxide, a metal sulfide, and an organic sulfur compound. The thickness of the positive electrode active material layer is preferably, for example, 1 to 300 µm inclusive. When the thickness of the positive electrode active material layer is 1 µm or more, sufficient capacity can be kept. On the other hand, when the thickness of the positive electrode active material layer is 300 µm or less, the positive electrode can keep high flexibility, and stress to the thin battery occurs less likely during bending.

When the first electrode disposed at the outermost side of the electrode assembly is a positive electrode, a binder in the positive electrode active material layer preferably includes a fluorocarbon resin including a polyvinylidene fluoride unit. This allows the first active material layer to easily hold the non-aqueous electrolyte. Thus, y<x is easily satisfied. Furthermore, this allows easier gelation of the non-aqueous electrolyte included in the first active material layer.

Examples of the conductive agent to be contained in the active material layer of the positive electrode or the negative electrode include graphites such as natural graphite and artificial graphite; and carbon blacks such as acetylene black, Ketjen black, channel black, furnace black, lamp black, and thermal black. An amount of the conductive agent is, for example, 0 to 20 parts by mass with respect to 100 parts by mass of the active material.

Examples of the binder to be contained in the active material layer of the positive electrode or the negative electrode include fluorocarbon resins including a polyvinylidene fluoride unit, for example, polyvinylidene fluoride (PVDF); fluorocarbon resins without including a polyvinylidene fluoride unit, for example, polytetrafluoroethylene; acrylic resins such as polyacrylonitrile and polyacrylic acid; and rubbers such as styrene-butadiene rubber. An amount of the binder is, for example, 0.5 to 15 parts by mass with respect to 100 parts by mass of the active material.

In the first active material layer, the fluorocarbon resin including a polyvinylidene fluoride unit may be used in combination with the other binder. In such a case, in view of enhancing the retention performance of the non-aqueous electrolyte in the first active material layer, it is preferable to include 10 mass % or more of the fluorocarbon resin including a polyvinylidene fluoride unit with respect to the whole amount of the binder.

It is preferable that the non-aqueous electrolyte is a mixture of a lithium salt and a non-aqueous solvent for dissolving lithium salt. Examples of the lithium salt include $LiClO_4$, $LiBF_4$, $LiPF_6$, $LiCF_3SO_3$, $LiCF_3CO_2$, and imide salts. Examples of the non-aqueous solvent include: cyclic carbonic acid esters such as propylene carbonate, ethylene carbonate, and butylene carbonate; chain carbonic acid esters such as diethyl carbonate, ethyl methyl carbonate, and dimethyl carbonate; and cyclic carboxylic acid esters such as γ-butyrolactone and γ-valerolactone.

For the separator, resin microporous membrane or non-woven fabric is preferably used. Preferable examples of materials (resin) for the separator include a polyolefin such as polyethylene and polypropylene; polyamides such as polyamide and polyamide-imide, or the like. The thickness of the separator is, for example, 8 to 30 μm.

The negative electrode lead and the positive electrode lead are connected by welding to, for example, a negative electrode current collector sheet or a positive electrode current collector sheet, respectively. Preferred examples of the negative electrode lead include a copper lead, a copper alloy lead, and a nickel lead. Preferred examples of the positive electrode lead include a nickel lead and an aluminum lead.

Hereinafter, the present invention is described in more detail with reference to Examples. However, the present invention is not construed to be limited to Examples.

Examples 1 to 4 and Comparative Example 1

A thin battery having a structure of "negative electrode-positive electrode-negative electrode" was produced by the following procedures.

(1) Production of Negative Electrode

For a negative electrode current collector sheet, 8 μm-thick electrolytic copper foil was prepared. Negative electrode mixture slurry was applied to one surface of the electrolytic copper foil, followed by drying, and then pressing the resultant product so as to form a negative electrode active material layer, and to obtain a negative electrode sheet. In pressing, a linear pressure was controlled so that a porosity of the negative electrode active material layer had values shown in Table 1. A negative electrode was cut out from the resultant negative electrode sheet such that the negative electrode was 23 mm×45 mm in size and had a 5 mm×5 mm tab. Then, a negative electrode lead of copper was ultrasonically welded to the tab. The negative electrode mixture slurry was prepared by mixing 100 parts by mass of graphite (average particle diameter: 22 μm) as a negative electrode active material, 8 parts by mass of a polyvinylidene fluoride-hexafluoropropylene copolymer (PVdF-HFP, content of a polyvinylidene fluoride unit: 5 mol %) as a binder, and an appropriate amount of N-methyl-2-pyrrolidone (NMP) with each other.

(2) Production of Positive Electrode

For a positive electrode current collector sheet, 15 μm-thick aluminum foil was prepared. Positive electrode mixture slurry was applied to both surfaces of the aluminum foil, followed by drying, and then then pressing the resultant product so as to form a positive electrode active material layer, and to obtain a positive electrode sheet. In pressing, a linear pressure was controlled so that a porosity of the positive electrode active material layer had values shown in Table 1. A positive electrode was cut out from the resultant positive electrode sheet such that the positive electrode was 21 mm×43 mm in size and had a 5 mm×5 mm tab. Then, a positive electrode lead made of aluminum was ultrasonically welded to the tab. The positive electrode mixture slurry was prepared by mixing 100 parts by mass of $LiCoO_2$ (average particle diameter: 20 μm) as a positive electrode active material, 2 parts by mass of acetylene black as the conductive agent, 2 parts by mass of a polyvinylidene fluoride (PVdF) as a binder, and an appropriate amount of NMP with each other.

The thickness of each active material layer was controlled such that the capacity ratio Cn/Cp of the negative electrode capacity Cn to the positive electrode capacity Cp became 1.05. The same is true to the Cn/Cp ratio in the below-mentioned Examples and Comparative Examples. The ratio Sn/Sp of the area Sn of the negative electrode active material layer to the area Sp of the positive electrode active material layer was 1.1.

(3) Assembling of Thin Battery

A positive electrode was disposed between a pair of negative electrodes such that a negative electrode active material layer and a positive electrode active material layer face each other, so as to obtain an electrode assembly. A separator made of a microporous polyethylene film (thickness: 9 μm) having a size of 23 mm×49 mm was disposed between each of the negative electrodes and the positive electrode.

Next, the electrode assembly was housed in a housing formed of a tubular laminated film with a barrier layer of aluminum. Herein, a laminate film having a total thickness of about 50 μm and having a three-layered structure of a polypropylene (PP) layer, aluminum vapor deposition membrane (thickness: 0.05 μm), a polyamide (PA) layer was used. The PP layer was disposed at the inner side and the PA layer was disposed at the outer side.

The positive electrode lead and the negative electrode lead were extended from one opening of the housing. The opening was sealed by thermal welding with the positive and negative electrode leads sandwiched therebetween. Next, an excessive amount of a non-aqueous electrolyte was injected into the housing through the other opening thereof, and then, air was evacuated therefrom in a reduced-pressure environment to impregnate the electrode assembly with the non-aqueous electrolyte. At this time, PVdF-HFP as a binder of the negative electrode was swollen into a gel state with the non-aqueous electrolyte. Next, the electrode assembly was pressurized from the outside of the housing with a pressure of 0.2 MPa so that excessive non-aqueous electrolyte was removed from the inside of the housing. Then, the other opening was sealed by thermal welding. The non-aqueous electrolyte was prepared by dissolving $LiPF_6$ into a mixed solvent of ethylene carbonate (EC), propylene carbonate (PC), diethyl carbonate (DEC), and dimethyl carbonate (DMC) (volume ratio: 30:5:30:35) at a concentration of 1 mol/L. In this way, battery A1 of Example 1, battery A2 of Example 2, battery A3 of Example 3, battery A4 of Example 4, and battery B1 of Comparative example 1, having a thickness of about 0.7 mm, were produced.

Evaluation 1

Content of Non-Aqueous Electrolyte Contained in Active Material Layer

A content x of the non-aqueous electrolyte per unit area of the negative electrode active material layer as a first active material layer and a content y of the non-aqueous electrolyte per unit area of the positive electrode active material layer as a second active material layer were measured in the following manner.

Firstly, masses Wn1 and Wp1 of a negative electrode and a positive electrode produced as mentioned above, before they were brought into contact with the non-aqueous electrolyte, were measured. Next, under reduced pressure of 50 kPa, the negative electrode and the positive electrode were impregnated with a sufficiently plenty amount of the non-aqueous electrolyte for 0.5 hours. Thereafter, each electrode was pressurized at 0.2 MPa by using a pair of pressure devices having a flat pressure surface larger than the area of each active material layer, so that an excessive non-aqueous electrolyte was removed. Next, masses Wn2 and Wp2 of the negative electrode and the positive electrode from which the excessive non-aqueous electrolyte had been removed were measured, respectively. The content x (g/cm$^2$) was calculated by dividing a difference between Wn1 and Wn2 (Wn1−Wn2) by an area of the negative electrode active material layer. Similarly, the content y (g/cm$^2$) was obtained by dividing a difference (Wp1−Wp2) by an area (total area of the both surfaces) of the positive electrode active material layer. The results are shown in Table 1.

Porosity of Active Material Layer

The pore volume distribution of each active material layer was measured by using a mercury porosimeter. As the porosimeter, Autopore III 9410 manufactured by Shimadzu Corporation was used. From the pore volume distribution, the distribution of pores having a pore diameter of 15 μm or less was extracted (pores having a pore diameter of more than 15 μm were excluded), and the integrated pore volume (Vp) was obtained. Note here that the pores were not included in the integrated pore volume because pores having a pore diameter of more than 15 μm is derived from concavity and convexity of the surface of the active material layer. The porosity was obtained from the following formula by dividing the obtained integrated pore volume Vp by an apparent volume (Va) of the active material layer. The results are shown in Table 1. Va was calculated from projected area (S) of the active material layer and thickness (T) of the active material layer (Va=ST). The thickness (T) of the active material layer was measured by using a contact type thickness measurement device.

Porosity (%)=(Vp/Va)×100

Initial Battery Capacity

A thin battery was subjected to the following charge and discharge under an environment at 25° C. to obtain initial capacity (C0). Results are shown in Table 1. However, the design capacity of the thin battery is 1 C (mAh).
(1) Constant current charge: 0.7 CmA (final voltage: 4.2 V)
(2) Constant voltage charge: 4.2 V (final electric current: 0.05 CmA)
(3) Constant current discharge: 0.2 CmA (final voltage: 3 V)

Capacity Retention Rate after Bending Test

Figure 6:
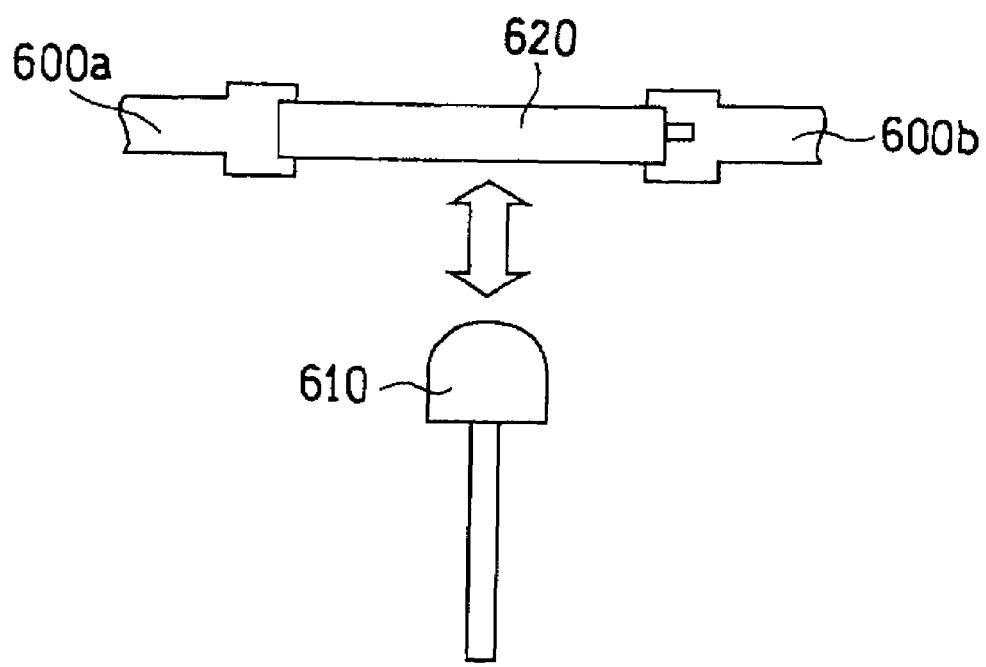
FIG. 6 is a view to illustrate a measurement method of a capacity retention rate after a bending test.

As shown in FIG. 6, a pair of expandable fixing members 600a and 600b were horizontally disposed such that they face each other. The portions closed by thermal welding at both ends of the charged thin battery were fixed by the fixing members, respectively. Then, in an environment at a temperature of 25° C., jig 610 having a curved surface portion whose radius of curvature R was 20 mm was pressed onto thin battery 620, to bend thin battery 620 following the curved surface portion. After 30 seconds, jig 610 was separated from thin battery 620, and thin battery 620 was allowed to regain its original shape. This operation was repeated 10,000 times. Thereafter, the thin battery was subjected to charge and discharge in the same conditions as mentioned above to obtain discharge capacity (Cx) after the bending test. The capacity retention rate was obtained from the obtained discharge capacity Cx and initial capacity C0 based on the following formula. Results are shown in Table 1.

Capacity retention rate after bending test (%)=(Cx/C0)×100

TABLE 1

|  | Battery B1 | Battery A1 | Battery A2 | Battery A3 | Battery A4 |
|---|---|---|---|---|---|
| Content x of non-aqueous electrolyte in negative electrode active material layer (ml/cm$^2$) | 1.7 | 2.5 | 7.0 | 17.6 | 20 |
| Content y of non-aqueous electrolyte in positive electrode active material layer (ml/cm$^2$) | 2.2 | 2.2 | 2.2 | 2.2 | 2.2 |
| x/y | 0.77 | 1.14 | 3.18 | 8.00 | 9.09 |
| Porosity of negative electrode active material layer (%) | 20 | 25 | 48 | 60 | 80 |
| Porosity of positive electrode active material layer (%) | 19 | 19 | 19 | 19 | 19 |
| Negative electrode binder | PVdF-HFP | PVdF-HFP | PVdF-HFP | PVdF-HFP | PVdF-HFP |
| Positive electrode binder | PVdF | PVdF | PVdF | PVdF | PVdF |
| Capacity retention rate (%) | 52 | 93 | 95 | 95 | 81 |

Example 5 and Comparative Example 2

A thin battery having a structure of "positive electrode-negative electrode-positive electrode" was produced by the following procedures.

(1) Production of Negative Electrode

A negative electrode sheet was produced in the same manner as in Example 1 except that negative electrode active material layers were formed on both surfaces of a negative electrode current collector sheet. In pressing, a linear pressure was controlled so that a porosity of the negative electrode active material layer had values shown in Table 2. A negative electrode was cut out from the resultant negative electrode sheet such that the negative electrode was 23 mm×45 mm in size and had a 5 mm×5 mm tab. A negative electrode lead was welded onto the tub. Thus, a negative electrode was obtained.

(2) Production of Positive Electrode

A positive electrode sheet was produced in the same manner as in Example 1 except that a positive electrode active material layer was formed on one surface of the positive electrode current collector sheet. In Example 5, a binder was changed to PVdF-HFP. In pressing, a linear pressure was controlled so that a porosity of the positive electrode active material layer had values shown in Table 2. A positive electrode was cut out from the resultant positive electrode sheet such that the positive electrode was 21 mm×43 mm in size and had a 5 mm×5 mm tab. Then, a positive electrode lead was welded to the tub. Thus, a positive electrode was obtained.

The ratio Sn/Sp of the area Sn of the negative electrode active material layer to the area Sp of the positive electrode active material layer was 1.1.

(3) Assembling of Thin Battery

An electrode assembly was produced in the same manner as in Example 1 except that the negative electrode was disposed between the pair of positive electrodes such that the negative electrode active material layer and the positive electrode active material layer face each other, to thus complete a thin battery. In this way, battery A5 of Example 5 and battery B2 of Comparative example 2, having a thickness of about 0.6 mm, were produced.

Evaluation 2

A content x of the non-aqueous electrolyte per unit area of the positive electrode active material layer as a first active material layer and a content y of the non-aqueous electrolyte per unit area of the negative electrode active material layer as a second active material layer were measured. Furthermore, a porosity of each active material layer was obtained. Furthermore, results of the capacity retention rates obtained by the same manner are shown in Table 2.

TABLE 2

|  | Battery B2 | Battery A5 |
|---|---|---|
| Content x of non-aqueous electrolyte in positive electrode active material layer (ml/cm$^2$) | 2.2 | 2.8 |
| Content y of non-aqueous electrolyte in negative electrode active material layer (ml/cm$^2$) | 2.5 | 2.5 |
| x/y | 0.88 | 1.12 |
| Porosity of positive electrode active material layer (%) | 19 | 25 |
| Porosity of negative electrode active material layer (%) | 25 | 20 |
| Positive electrode binder | PVdF | PVdF-HFP |
| Negative electrode binder | PVdF-HFP | PVdF-HFP |
| Capacity retention rate (%) | 59 | 88 |

Comparative Example 3

A thin battery having a structure of "negative electrode-positive electrode" was produced by the following procedures.

(1) Production of Negative Electrode

A negative electrode having a negative electrode active material layer on one surface of the negative electrode current collector sheet was produced as in Example 2.

(2) Production of Positive Electrode

A positive electrode having a positive electrode active material layer on one surface of the positive electrode current collector sheet was produced as in Comparative Example 2.

The ratio Sn/Sp of the area Sn of the negative electrode active material layer to the area Sp of the positive electrode active material layer was 1.1.

(3) Assembling of Thin Battery

An electrode assembly was produced in the same manner as in Example 1 except that the positive electrode and the negative electrode were disposed facing each other such that the negative electrode active material layer and the positive electrode active material layer face each other, to thus complete a thin battery.

Comparative Example 4

A thin battery having a structure of "negative electrode-positive electrode-negative electrode-positive electrode" was produced by the following procedures.

(1) Production of Negative Electrode

As in Example 2, a negative electrode (outer negative electrode) having a negative electrode active material layer on one surface of the negative electrode current collector sheet was produced. Furthermore, as in Comparative Example 2 (however, the porosity was made to be the same as in Example 2), a negative electrode (inner negative electrode) including negative electrode active material layers on both surfaces of the negative electrode current collector sheet was produced.

(2) Production of Positive Electrode

As in Comparative example 2, a positive electrode (outer positive electrode) having a positive electrode active material layer on one surface of a positive electrode current collector sheet was produced. As in Example 2, a positive electrode (inner positive electrode) including positive electrode active material layers on both surfaces of the positive electrode current collector sheet was produced.

The ratio Sn/Sp of the area Sn of the negative electrode active material layer to the area Sp of the positive electrode active material layer was 1.1.

(3) Assembling of Thin Battery

An electrode assembly was produced as in Example 1 except that the outer negative electrode and the outer positive electrode were disposed at the outermost side, and the positive electrode and the negative electrode were disposed such that the negative electrode active material layer and the positive electrode active material layer were disposed alternately, to thus complete a thin battery.

Evaluation 3

A content x of the non-aqueous electrolyte per unit area of the negative electrode active material layer, a content y of the non-aqueous electrolyte per unit area of the positive electrode active material layer, and porosities of the active material layers are shown in Table 3. Furthermore, the results of the capacity retention rates obtained in the same manner as mentioned above are shown in Table 3.

TABLE 3

|  | Battery B3 | Battery B4 |
|---|---|---|
| Content x of non-aqueous electrolyte in negative electrode active material layer (ml/cm$^2$) | 7.0 | 7.0 |
| Content y of non-aqueous electrolyte in positive electrode active material layer (ml/cm$^2$) | 2.2 | 2.2 |
| x/y | 3.18 | 3.18 |
| Porosity of negative electrode active material layer (%) | 48 | 48 |

TABLE 3-continued

|  | Battery B3 | Battery B4 |
|---|---|---|
| Porosity of positive electrode active material layer (%) | 19 | 19 |
| Negative electrode binder | PVdF-HFP | PVdF-HFP |
| Positive electrode binder | PVdF | PVdF |
| Capacity retention rate (%) | 65 | 66 |

Example 6

A thin battery having the same structure as in Example 2 was produced by the following procedures.
(1) Production of Negative Electrode
The negative electrode was produced as in Example 2 except that PVdF was used as a binder.
(2) Production of Positive Electrode
A positive electrode was produced in the same manner as in Example 2.
(3) Assembling of Thin Battery
An electrode assembly was produced in the same manner as in Example 1, and a thin battery was completed. Thus, battery A6 of Example 6 was produced.

Example 7

A thin battery having the same structure as in Example 2 was produced by the following procedures.
(1) Production of Negative Electrode
Negative electrode mixture slurry was prepared by mixing 100 parts by mass of graphite (average particle diameter: 20 μm) as a negative electrode active material, 1.5 parts by mass of styrene-butadiene rubber (SBR) as a binder, 1.5 parts by mass of carboxymethylcellulose (CMC), and an appropriate amount of water with each other. A negative electrode was produced in the same manner as in Example 2 except that the prepared negative electrode mixture slurry was used.
(2) Production of Positive Electrode
A positive electrode was produced in the same manner as in Example 2.
(3) Assembling of Thin Battery
An electrode assembly was produced in the same manner as in Example 1, and a thin battery was completed. Thus, battery A7 of Example 7 was produced.
Evaluation 4
A content x of the non-aqueous electrolyte per unit area of the negative electrode active material layer, a content y of the non-aqueous electrolyte per unit area of the positive electrode active material layer, and porosities of the active material layers are shown in Table 4. Furthermore, the results of the capacity retention rates obtained in the same manner as mentioned above are shown in Table 4.

TABLE 4

|  | Battery A6 | Battery A7 |
|---|---|---|
| Content x of non-aqueous electrolyte in negative electrode active material layer (ml/cm$^2$) | 7.0 | 7.0 |
| Content y of non-aqueous electrolyte in positive electrode active material layer (ml/cm$^2$) | 2.2 | 2.2 |
| x/y | 3.18 | 3.18 |
| Porosity of negative electrode active material layer (%) | 48 | 48 |
| Porosity of positive electrode active material layer (%) | 19 | 19 |
| Negative electrode binder | PVdF | SBR, CMC |
| Positive electrode binder | PVdF | PVdF |
| Capacity retention rate (%) | 91 | 85 |

Example 8

A thin battery having a structure of "negative electrode-positive electrode-negative electrode-positive electrode-negative electrode" was produced by the following procedures.
(1) Production of Negative Electrode
As in Example 2, a negative electrode (outer negative electrode) having a negative electrode active material layer on one surface of the negative electrode current collector sheet was produced. Furthermore, as in Comparative Example 4, a negative electrode (inner negative electrode) including negative electrode active material layers on both surfaces of the negative electrode current collector sheet was produced.
(2) Production of Positive Electrode
As in Example 2, a positive electrode having positive electrode active material layers on both surfaces of the positive electrode current collector sheet was produced.
(3) Assembling of Thin Battery
An electrode assembly was produced as in Example 1 except that a pair of outer negative electrodes were disposed at the outermost side, and the other electrode was disposed such that the negative electrode active material layer and the positive electrode active material layer were disposed alternately, and, thus, battery A8 of Example 8 was produced.

Example 9

An electrode assembly having a structure of "negative electrode-positive electrode-negative electrode-positive electrode-negative electrode" was produced as in Example 8 except that the porosity of the negative electrode active material layer of the inner negative electrode was controlled to 22%, and thus battery A9 of Example 9 was produced.

Example 10

Two inner negative electrodes similar to those in Example 9 and three positive electrodes were prepared, and battery A10 of Example 10 having a structure of "negative electrode-positive electrode-negative electrode-positive electrode-negative electrode-positive electrode-negative electrode" was produced.
Evaluation 5
A content x of the non-aqueous electrolyte per unit area of the negative electrode active material layer, a content y of the non-aqueous electrolyte per unit area of the positive electrode active material layer, and porosities of the active material layers are shown in Table 5. Furthermore, the results of the capacity retention rates obtained in the same manner as mentioned above are shown in Table 5.

TABLE 5

|  | Battery A8 | Battery A9 | Battery A10 |
|---|---|---|---|
| Content x of non-aqueous electrolyte in (outer) negative electrode active material layer (ml/cm$^2$) | 7.0 | 7.0 | 7.0 |

TABLE 5-continued

| | Battery A8 | Battery A9 | Battery A10 |
|---|---|---|---|
| Content y of non-aqueous electrolyte in positive electrode active material layer (ml/cm$^2$) | 2.2 | 2.2 | 2.2 |
| x/y | 3.18 | 3.18 | 3.18 |
| Porosity of (outer) negative electrode active material layer (%) | 48 | 48 | 48 |
| Porosity of positive electrode active material layer (%) | 19 | 19 | 19 |
| Content of non-aqueous electrolyte in (inner) negative electrode active material layer (ml/cm$^2$) | 7.0 | 2.3 | 2.3 |
| Porosity of (inner) negative electrode active material layer (%) | 48 | 22 | 22 |
| Negative electrode binder | PVdF-HFP | PVdF-HFP | PVdF-HFP |
| Positive electrode binder | PVdF | PVdF | PVdF |
| Capacity retention rate (%) | 96 | 95 | 95 |

INDUSTRIAL APPLICABILITY

A thin battery of the present invention is suitable for use in a small-sized electronic equipment such as a biological wearable device or a wearable portable terminal of a thin battery.

The invention claimed is:

1. A thin battery comprising:
a sheet-like electrode assembly;
a non-aqueous electrolyte with which the electrode assembly is impregnated; and
a housing for housing the electrode assembly and the non-aqueous electrolyte in a sealed manner,
wherein the electrode assembly includes a pair of first electrodes disposed at outermost sides of the electrode assembly, a second electrode disposed between the pair of first electrodes, and a separator disposed between each of the first electrodes and the second electrode,
each of the first electrodes includes a first current collector sheet and a first active material layer attached to one surface of the first current collector sheet,
the second electrode has a polarity different from a polarity of the first electrode, and includes a second current collector sheet and second active material layers attached to both surfaces of the second current collector sheet, and
a content x of the non-aqueous electrolyte per unit area of the first active material layer is larger than a content y of the non-aqueous electrolyte per unit area of each of the second active material layers.

2. The thin battery of claim 1, wherein the content x of the non-aqueous electrolyte per unit area of the first active material layer and the content y of the non-aqueous electrolyte per unit area of each of the second active material layers satisfy: $1.1 \leq x/y \leq 8$.

3. The thin battery of claim 1, wherein the second electrode comprises two or more second electrodes, and
the thin battery further comprises one or more third electrodes disposed between a pair of the second electrodes,
wherein each of the one or more third electrodes has a polarity identical to the polarity of the first electrode, and includes a third current collector sheet and third active material layers attached to both surfaces of the third current collector sheet, and
the content x of the non-aqueous electrolyte per unit area of the first active material layer is larger than or equal to a content z of the non-aqueous electrolyte per unit area of each of the third active material layers.

4. The thin battery of claim 3, wherein the content z of the non-aqueous electrolyte per unit area of each of the third active material layers is larger than the content y of the non-aqueous electrolyte per unit area of each of the second active material layers.

5. The thin battery of claim 3, wherein the second electrode comprises n second electrodes, and the third electrode comprises (n−1) third electrodes, wherein n is an integer of 3 or more.

6. The thin battery of claim 1, wherein a porosity A of the first active material layer is 20 to 80% inclusive, and a porosity B of each of the the second active material layers is smaller than the porosity A.

7. The thin battery of claim 1, wherein the first active material layer includes a negative electrode active material, and a binder, and
the binder is a fluorocarbon resin including a polyvinylidene fluoride unit.

8. The thin battery of claim 1, wherein at least a part of the non-aqueous electrolyte contained in the first active material layer is in a gel state.

9. The thin battery of claim 7, wherein an area of the first active material layer is larger than an area of each of the second active material layers.

10. A battery-mounted device comprising:
the thin battery as defined in claim 1; and
flexible electronic equipment to be driven by electric power supplied from the thin battery,
wherein the thin battery and the electronic equipment are integrated together to form a sheet.

11. The thin battery of claim 2, wherein the second electrode comprises two or more second electrodes, and
the thin battery further comprises one or more third electrodes disposed between a pair of the second electrodes,
wherein each of the one or more third electrodes has a polarity identical to the polarity of the first electrode, and includes a third current collector sheet and third active material layers attached to both surfaces of the third current collector sheet, and
the content x of the non-aqueous electrolyte per unit area of the first active material layer is larger than or equal to a content z of the non-aqueous electrolyte per unit area of each of the third active material layers.

12. The thin battery of claim 11, wherein the content z of the non-aqueous electrolyte per unit area of each of the third active material layers is larger than the content y of the non-aqueous electrolyte per unit area of each of the second active material layers.

13. The thin battery of claim 12, wherein the second electrode comprises n second electrodes, and the third electrode comprises (n−1) third electrodes, wherein n is an integer of 3 or more.

14. The thin battery of claim 8, wherein an area of the first active material layer is larger than an area of each of the second active material layers.

* * * * *